UNITED STATES PATENT OFFICE.

ANDREW M. MURRAY, OF RICHMOND, INDIANA.

ARTIFICIAL SLATE.

SPECIFICATION forming part of Letters Patent No. 292,569, dated January 29, 1884.

Application filed October 29, 1883. (No specimens.)

*To all whom it may concern:*

Be it known that I, ANDREW M. MURRAY, a citizen of the United States, residing at Richmond, in the county of Wayne and State of Indiana, have invented certain new and useful Improvements in Artificial Slates, of which the following is a specification.

My invention relates to an artificial-slate material which may be used in the ordinary manner for blackboard and school-slate purposes.

My invention consists in a composition of matter, more fully described herein, and which, when prepared, allows the marks made by steatite, chalk, or slate-pencil to be readily and perfectly removed by the use of an ordinary cloth or sponge eraser, either dry or damp.

My slate composition is made and prepared in the following manner: For a black slate, I use two (2) parts of lamp-black or drop-black; one (1) part rotten-stone; one (1) part flour of emery; one (1) part mineral-brown; one (1) part ultramarine-blue. Mix these elements with oil-shellac to the consistency of a stiff paste when used with a trowel, and to the consistency of ordinary paint when intended to be applied with a brush. This compound may be used upon a smooth surface of wood or metal, or on ordinary walls, or on paper. For other color than black, the desired color may be produced by using such coloring-matter as may be required to produce the color wanted. This mixture will dry readily after being applied, and, if found necessary, the surface may be smoothed by rubbing with fine emery-paper, or in other suitable manner.

Having thus fully described my said invention, what I claim as new, and desire to secure by Letters Patent, is—

A composition composed of two (2) parts of lamp-black or drop-black, one (1) part of rotten-stone, one (1) part flour of emery, one (1) part mineral-brown, one part ultramarine-blue, mixed with oil-shellac to consistency of stiff paste.

In testimony whereof I affix my signature in presence of two witnesses.

ANDREW M. MURRAY.

Witnesses:
 JOHN T. DEAL,
 W. T. DENNIS.